United States Patent [19]

Metezeau et al.

[11] Patent Number: 5,779,192
[45] Date of Patent: Jul. 14, 1998

[54] THRUST REVERSER WITH IMPROVED FORWARD THRUST EFFICIENCY

[75] Inventors: Emile Fabrice Henri Metezeau, Le Havre; Marcel Jean-Fabrice Portal, Ste Adresse, both of France

[73] Assignee: Societe Hispano-Suiza, Saint Cloud Cedex, France

[21] Appl. No.: 566,433

[22] Filed: Nov. 30, 1995

[30] Foreign Application Priority Data

Nov. 30, 1994 [FR] France ................... 94 14341

[51] Int. Cl.$^6$ ................ F02K 1/68; F02K 1/60
[52] U.S. Cl. .......... 244/110 B; 60/226.2; 239/265.29; 239/265.37
[58] Field of Search .......... 244/110 B; 60/226.2; 239/265.19, 265.25, 265.27, 265.29, 265.33, 265.37

[56] References Cited

U.S. PATENT DOCUMENTS

| | | | |
|---|---|---|---|
| 2,757,510 | 8/1956 | Holloway | 239/265.33 |
| 2,876,619 | 3/1959 | Johnstone | 239/265.33 |
| 3,655,150 | 4/1972 | Haberkorn et al. | 244/110 B X |
| 3,814,323 | 6/1974 | Leynaert et al. | |
| 3,984,974 | 10/1976 | Medawar et al. | 239/265.37 X |
| 4,618,094 | 10/1986 | Palmer | 239/265.37 |
| 4,805,840 | 2/1989 | Tape | 239/265.37 |
| 4,865,256 | 9/1989 | Durand et al. | |
| 5,097,661 | 3/1992 | Lair et al. | |
| 5,176,340 | 1/1993 | Lair | 244/110 B |
| 5,221,048 | 6/1993 | Lair | 239/265.37 |
| 5,476,224 | 12/1995 | Tonks | 236/265.37 |

FOREIGN PATENT DOCUMENTS

| | | | |
|---|---|---|---|
| 2.133.507 | 12/1972 | France. | |
| 2.166.296 | 8/1973 | France. | |
| 2.601.077 | 1/1988 | France. | |
| 2.622.928 | 5/1989 | France. | |
| 2.672.339 | 8/1992 | France. | |
| 182858 | 3/1963 | Sweden | 244/110 B |

*Primary Examiner*—William Grant
*Attorney, Agent, or Firm*—Bacon & Thomas

[57] ABSTRACT

A thrust reverser is disclosed for a turbojet engine having a central axis and an exhaust nozzle wherein the thrust reverser has a plurality of deflectors pivotally attached to the turbojet engine so as to pivot about axes extending generally traverse to the central axis between a forward thrust position, wherein the plurality of deflectors form a downstream end of the exhaust nozzle, and a reverse thrust position wherein the deflectors deflect gases emanating from the engine to generate a reverse thrust. Each of the movable deflectors has a downstream trailing edge located such that all of the trailing edges of the deflectors lie in a common plane extending substantially transverse to the central axis.

1 Claim, 4 Drawing Sheets

THRUST REVERSER WITH IMPROVED FORWARD THRUST EFFICIENCY

BACKGROUND OF THE INVENTION

The present invention relates to a thrust reverser for a turbojet engine, more particularly such a thrust reverser having a plurality of pivoting deflectors configured to improve the efficiency of the turbojet engine when in their forward thrust positions.

French Patent A 2,622,928 discloses a known thrust reverser for a turbojet engine in which the thrust reverser comprises deflectors acting on the bypass air flow of a high-bypass type turbojet engine. In this known thrust reverser, the deflectors, in addition to reversing either just the bypass airflow, or the total gas flow from the turbojet engine, also constitute a portion of the exhaust nozzle when in their forward thrust positions. Consequently, the downstream edges of the deflectors constitute the downstream edge of the outer wall of the exhaust nozzle, in particular the annular duct through which circulates the bypass airflow. In such known thrust reversers, the deflectors pivot about attachment points relative to the stationary structure of the engine.

FIG. 1 illustrates a known thrust reverser. This thrust reverser is constituted by a stationary upstream structure 1 affixed to the turbojet engine 2, or to its nacelle which comprises an inner wall 3 forming the exterior boundary of an annular gas circulation duct 4, an outer wall 5 affixed to the inner wall 3 and a pair of side structures 6. The thrust reverser deflectors 7a and 7b are pivotally attached to the stationary structure by means of pivots 8 supported on the side structures 6. The side structures 6 also serve as mounting points for a control system for moving and locking the deflectors 7a and 7b between forward thrust positions (as illustrated in FIG. 1) and reverse thrust positions in which they deflect the gases emanating from the gas flow duct 4.

This type of thrust reverser incurs aerodynamic losses when the deflectors are in their forward thrust positions. The aerodynamic losses may be significant and may substantially degrade the desired performance of the turbojet engine. Such aerodynamic losses are caused by the downstream edges 9 of the deflector which are configured to engage each other when the deflectors are in their reverse thrust positions. Such configurations run contrary to the most desired shape for the downstream edge of the nozzle when the thrust reversers are in their forward thrust positions.

As can be seen, the downstream edges 9 are not co-planar, nor do they extend perpendicular to the central axis. The side gaps result in lowered efficiency for the nozzle, thereby degrading engine performance.

French Patent A 2,638,783 discloses a thrust reverser which proposes to avoid the aforementioned problems by adding movable side flaps to the thrust reverser. However, such a structure increases the complexity of the nozzle, thereby lowering its reliability, as well as increasing the weight of the structure.

French Patent A 2,601,077 discloses a stationary structure downstream of the thrust reverser deflectors to overcome the aforementioned drawbacks. However, such a structure increases the weight of the nozzle due to the duct extension and the required mechanism to allow moving the deflectors while achieving a sufficient aperture in the thrust reverser position upstream of the structure.

French Patent A 2,672,339 discloses a thrust reverser in which, in addition to the pivoting deflectors, a translating shroud is mounted on the downstream side of the thrust reverser. Again, this structure has increased complexity and weight, and an inherently lower reliability than is desired.

SUMMARY OF THE INVENTION

A thrust reverser is disclosed for a turbojet engine having a central axis and an exhaust nozzle wherein the thrust reverser has a plurality of deflectors pivotally attached to the turbojet engine so as to pivot about axes extending generally traverse to the central axis between a forward thrust position, wherein the plurality of deflectors form a downstream end of the exhaust nozzle, and a reverse thrust position wherein the deflectors deflect gases emanating from the engine to generate a reverse thrust. Each of the movable deflectors has a downstream trailing edge located such that all of the trailing edges of the deflectors lie in a common plane extending substantially traverse to the central axis.

Such a structure lowers the aerodynamic losses at the downstream edge of the nozzle when in the forward thrust mode, without incurring the drawbacks of increased weight or complexity that plague the known prior solutions to this problem.

The traverse plane in which the trailing edges of the deflectors lie extends approximately perpendicular to the longitudinal axis of symmetry of the thrust reverser which constitutes the central axis of the turbojet engine.

In order to facilitate the movement of the deflectors to efficient, reverse thrust positions, the pivoting axes of a pair of deflectors may be spaced apart in a longitudinal direction along the central axis, or the trailing edges of the deflectors may form a configuration that is non-coaxial with the central axis and which is not a shape of revolution. Alternatively, one or more of the deflectors may have a recessed portion adjacent to its trailing edge located so as to accommodate a corresponding portion of another deflector when the deflectors are in their reverse thrust positions.

DETAILED DESCRIPTION OF THE PREFERRED EMBODIMENTS

Figure 1:
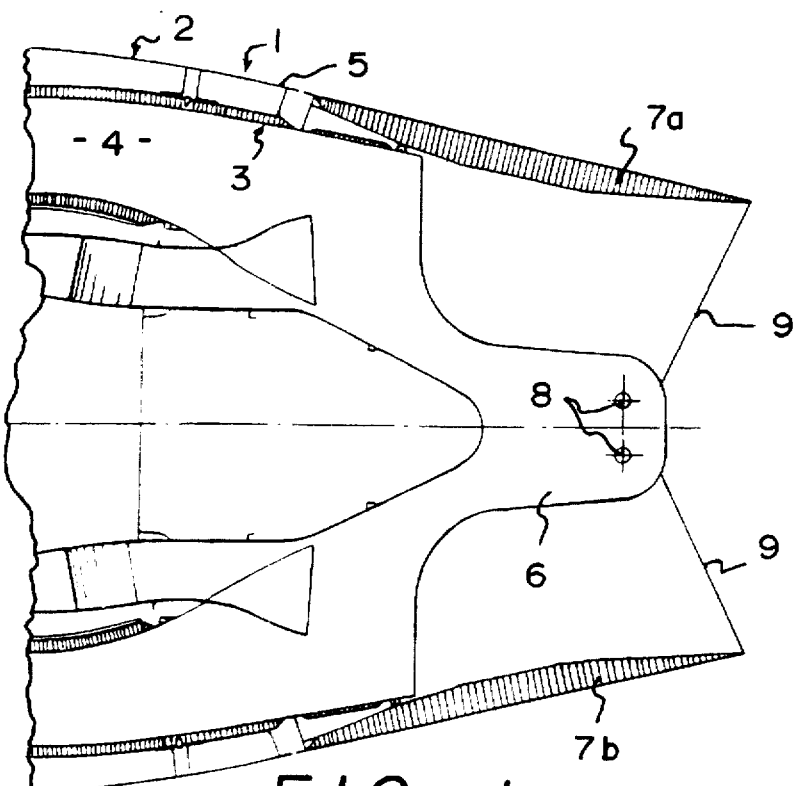
FIG. 1 is a partial, cross-sectional view of a turbojet engine incorporating a known thrust reverser.
Figure 2:
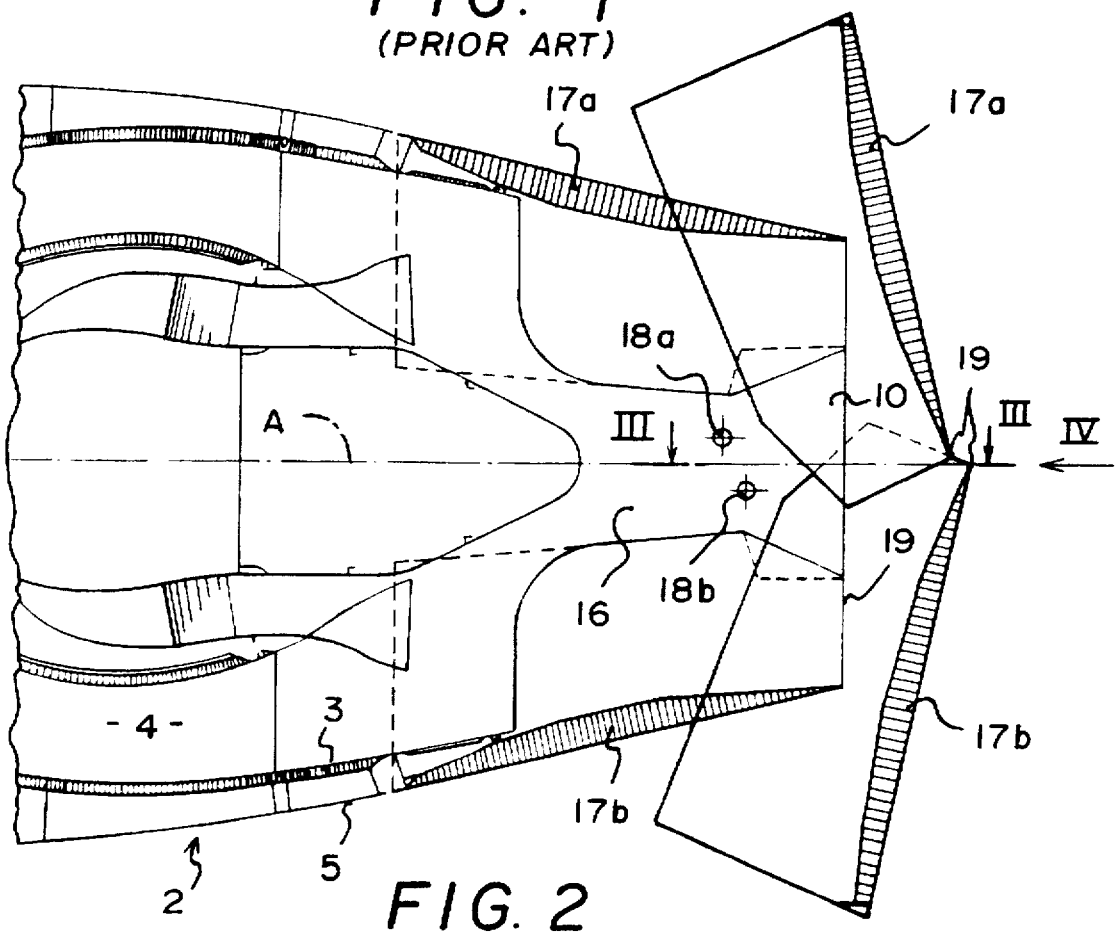
FIG. 2 is a partial, cross-sectional schematic view of a turbojet engine incorporating the thrust reverser according to a first embodiment of the present invention.

The first embodiment of the thrust reverser according to the present invention is illustrated in FIG. 2 wherein elements having a function similar to the known thrust reverser of FIG. 1 have been assigned the same identifying numerals increased by 10. As can be seen, the thrust reverser is attached to a stationary upstream structure 1 affixed to the turbojet engine 2 and comprising an inner wall 3, bounding a gas duct 4, and an outer wall 5. The movable deflectors 17a and 17b, which in this particular instance comprise two such deflectors, have downstream ends which constitute the trailing edge 19 of the exhaust gas nozzle. When the deflector 17a and 17b are in their forward thrust positions, it can be seen that the downstream ends of the deflectors, which constitute the trailing edge 19 of the exhaust nozzle lie in a common plane that extends substantially traverse and approximately perpendicular tithe thrust reverser axis of symmetry, or the central axis A of the turbojet engine.

Figure 4:
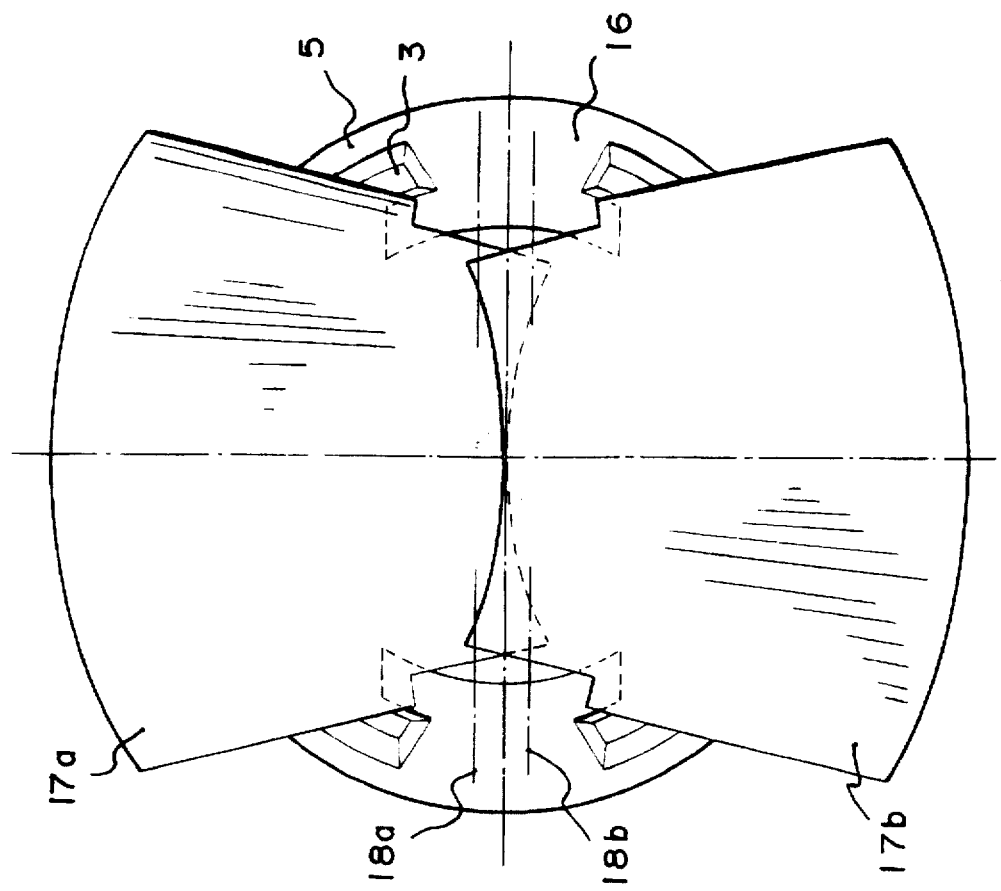
FIG. 4 is a view taken in the direction of arrow IV in FIG. 2 of the thrust reverser with the deflectors in their reverse thrust positions.
Figure 3:
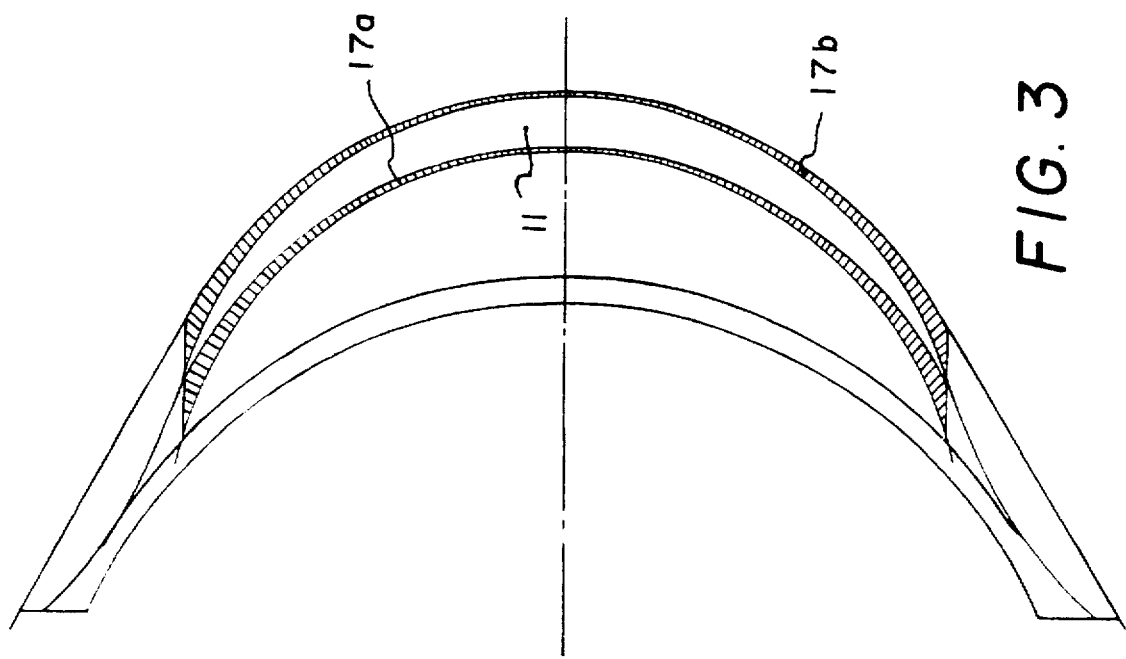
FIG. 3 is a cross-sectional view taken along line III—III in FIG. 2.

Deflector 17a is pivotally attached to the stationary side structures 16 so as to pivot about axis 18a. Similarly, deflector 17b is attached to fixed side structures 16 so as to pivot about axis 18b. Both pivoting axes 18a, 18b, extend generally traverse to the central axis A. As can be seen, axes 18a and 18b are longitudinally spaced apart in a direction along the central axis A. The rear portions 10 of the stationary side structures 16 are designed to allow the deflectors 17a and 17b to pivot about their respective axes from their forward thrust positions to their reverse thrust positions such as illustrated in FIGS. 2–4. Any known actuating system can be utilized to move the deflectors between their two positions, such having been omitted from the drawings for the sake of clarity.

Some leakage is acceptable in a leakage zone 11, illustrated in FIG. 3, between the ends 19 of the movable deflectors 17a and 17b when in their reverse thrust positions. However, appropriately sizing the deflectors 17a and 17b, in particular extending their trailing edges rearwardly, allows reducing the clearance between the deflectors 17a and 17b when in their reverse thrust positions and, consequently, permits reducing this leakage to an acceptable level in regard to the reverse thrust efficiency and corresponding performance.

Figure 6:
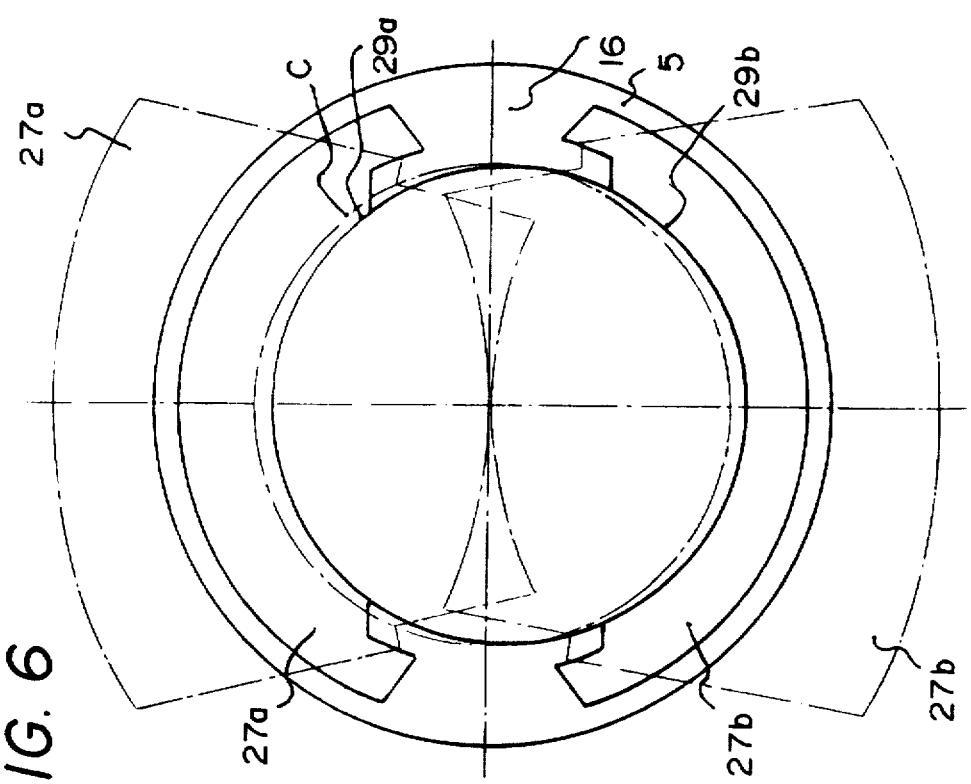
FIG. 6 is a view taken in the direction of arrow VI in FIG. 5 with the thrust reverser deflectors shown in their forward thrust positions in solid lines and in their reverse thrust positions in dashed lines.
Figure 5:
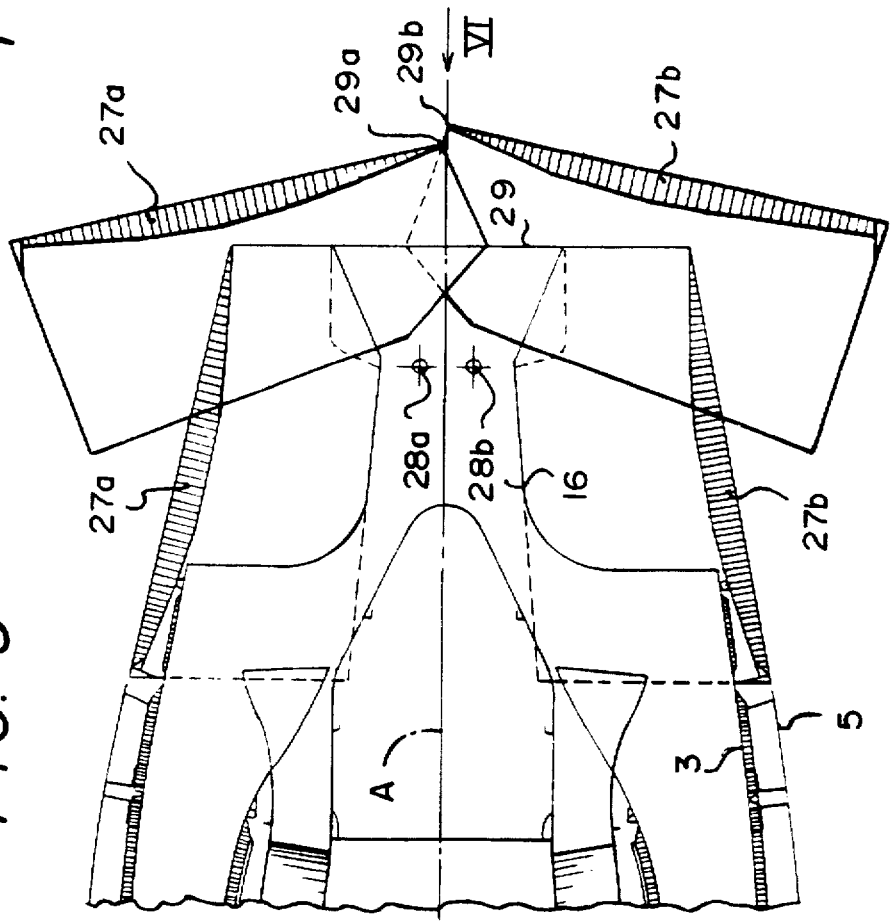
FIG. 5 is a partial, cross-sectional schematic view similar to FIG. 2, but illustrating a second embodiment of the thrust reverser according to the present invention.

A second embodiment of the invention is illustrated in FIGS. 5 and 6. As in the first embodiment, the trailing edges 29 of the deflectors 27a and 27b lie in a common plane extending generally transversely and perpendicular to the axis A. In this embodiment, the trailing edges 29 form a configuration that is not a shape of revolution, nor is it coaxial with the central axis A. The trailing edge 29a of deflector 27a and the trailing edge 29b of the deflector 27b are illustrated in FIG. 6, which also illustrates the eccentricity of these edges with reference to a reference circle C centered on, and symmetrical about, axis A. This design maintains the common plane of the trailing edges of the deflectors, while at the same time avoids interference between the trailing edges of the deflectors 27a and 27b when they move into their reverse thrust positions. The pivot axes 28a and 28b again extend generally transversely with respect to the central axis A, although in this embodiment such axes are aligned in a longitudinal direction along the central axis A. This embodiment may incorporate the design of the rear portions 10 of the stationary side structures 16 disclosed in the embodiment illustrated in FIGS. 2–4 to facilitate the pivoting motion of deflectors 27a and 27b. Again, some leakage may take place between the trailing edges 29a and 29b when the deflectors 27a and 27b are in their reverse thrust positions, however this leakage remains within acceptable limits.

Figure 7:
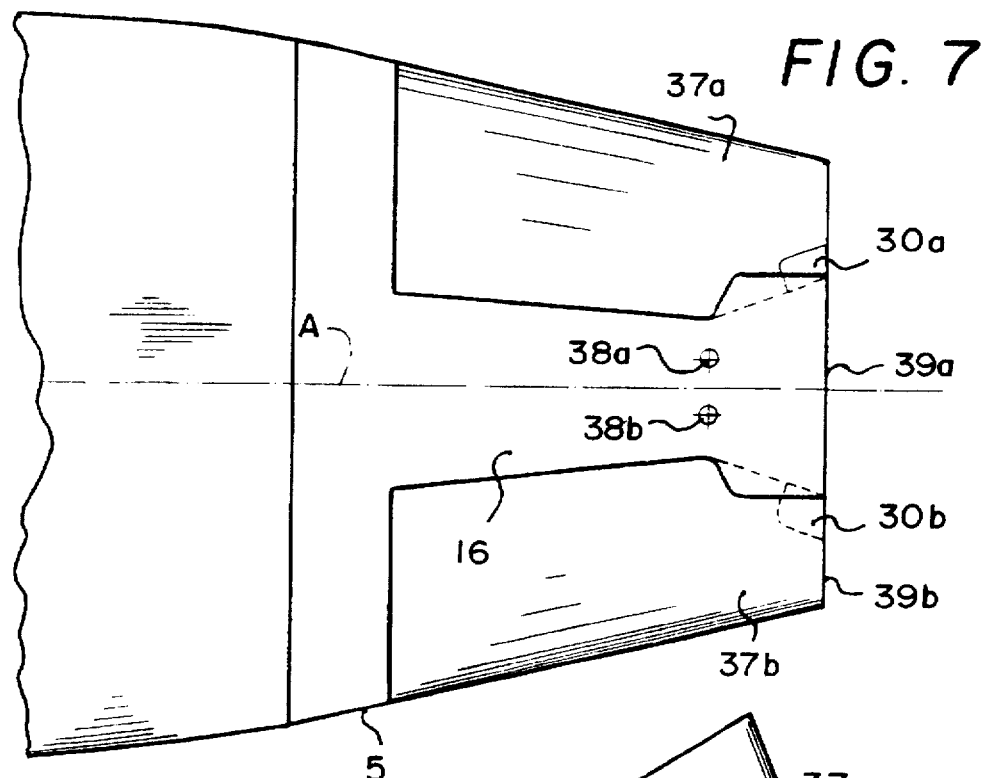
FIG. 7 is a partial side view of a third embodiment of the thrust reverser according to the present invention with the thrust reverser doors in their forward thrust positions.
Figure 8:
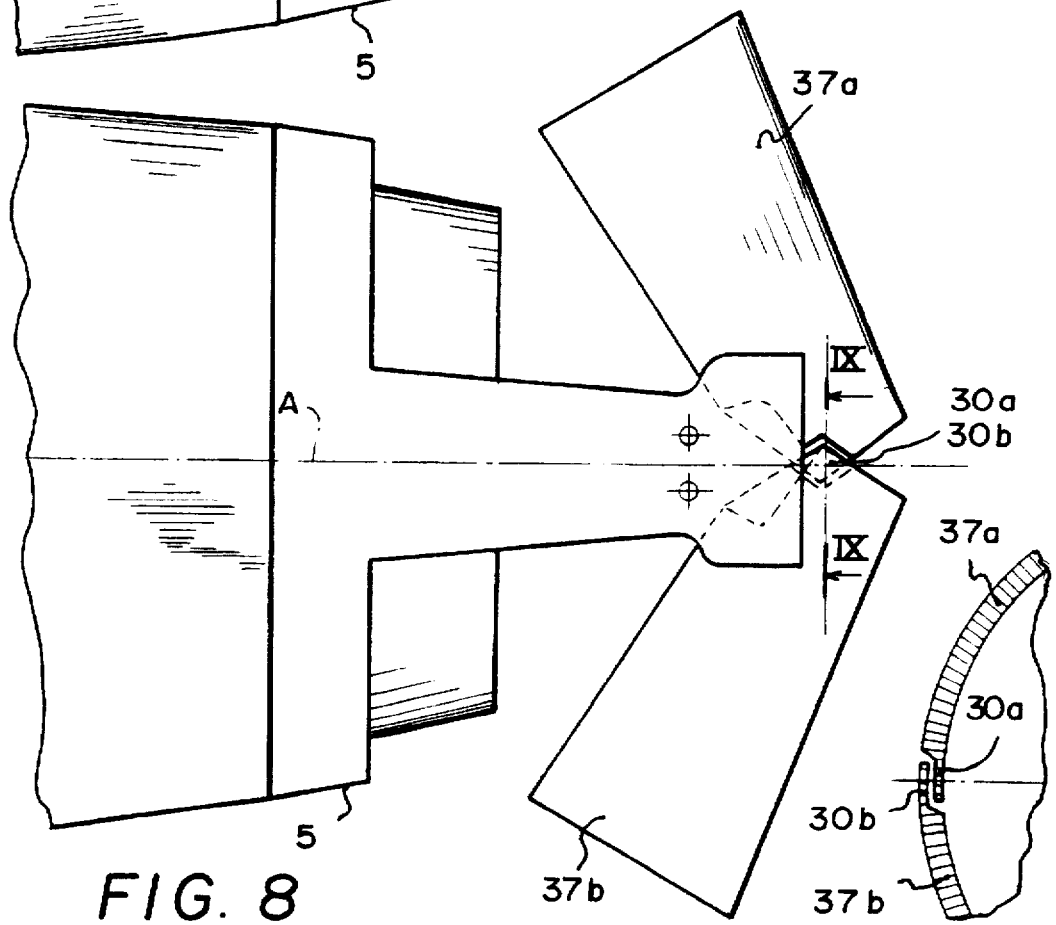
FIG. 8 is a side view, similar to FIG. 7, but illustrating the thrust reverser deflectors in their reverse thrust positions.
Figure 9:
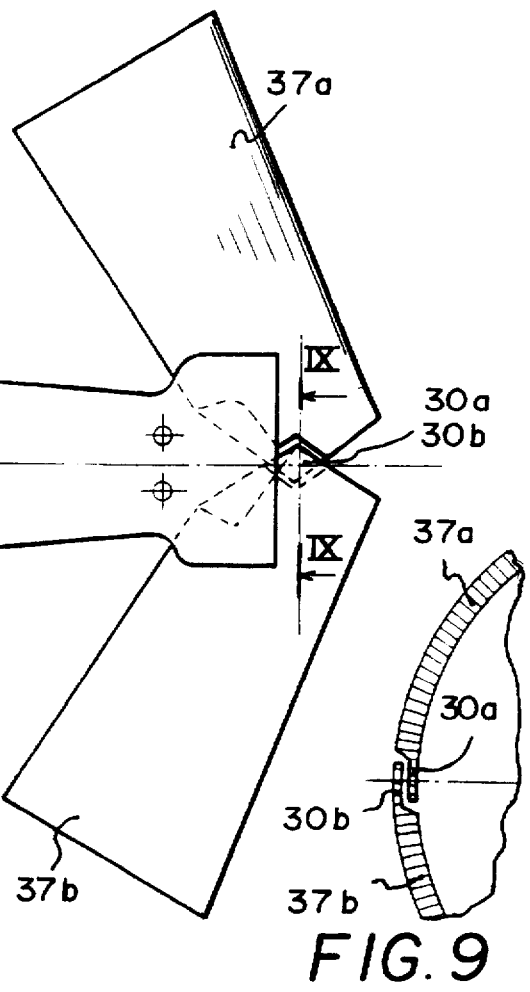
FIG. 9 is a partial, enlarged cross-sectional view taken along line IX—IX in FIG. 8.

A third embodiment of the invention is illustrated in FIGS. 7–9. As can been seen, the trailing edges 39a and 39b of deflectors 37a and 37b lie in a common plane extending transversely and perpendicularly with respect to the central axis A. To avoid any interference between the deflectors 37a and 37b when moving into their reverse thrust positions, as illustrated in FIG. 8, recessed zones 30a and 30b are provided adjacent to the trailing edges to allow such portions of the deflectors of 37a and 37b to mutually overlap when in their reverse thrust positions. As can be seen in FIG. 9, one of the deflectors is recessed radially inwardly from an exterior surface, while the corresponding deflector is recessed radially outwardly from an inner surface. Such recessed zones 30a and 30b may be very small, to assure that the deflectors 37a and 37b will not abut in their reversed thrust position and that leakage is within acceptable limits. Such leakage may be compensated for by improving the efficiency of the reversed flow and by decreasing the angle of opening of the deflectors 37a and 37b. In applications utilizing such movable deflectors, as illustrated in FIGS. 7 and 8, two overlap recessed zones must be provided while observing symmetry, and deflectors 37a and 37b may be formed identically.

Although the embodiments of this invention have been described in utilizing two movable deflectors, it is to be understood that the principles of this invention may be applicable to thrust reversers utilizing any number of movable deflectors.

The illustrative embodiments of the invention are shown as applied to a thrust reverser of a bypass-type turbojet engine. However, it is also to be understood that the principles of this invention may be applied to any type of turbojet engine with a thrust reverser in which, when in their forward thrust positions, the deflectors constitute the downstream end of the exhaust duct or nozzle.

The foregoing description is provided for illustrative purposes only and should not be construed as in any way limiting this invention, the scope of which is defined solely by the independent claims.

We claim:

1. A thrust reverser for a turbojet engine having a central axis and an exhaust nozzle, the thrust reverser comprising first and second deflectors pivotally attached to the turbojet engine such that the first deflector pivots about a single non-translating first pivot axis and the second deflector pivots about a single non-translating second pivot axis, the first and second pivot axes extending generally transverse to the central axis, the first and second deflectors pivoting between forward thrust positions, wherein the first and second deflectors form a downstream end of the exhaust nozzle and reverse thrust positions wherein the first and second deflectors deflect gases emanating from the turbojet engine, each deflector having a trailing edge such that the trailing edges of the first and second deflectors lie in a common plane extending substantially transverse to the central axis when the deflectors are in their forward thrust positions, wherein the first and second pivot axes are longitudinally displaced from each other along the central axis.

* * * * *